US008286896B2

(12) United States Patent
Fujita et al.

(10) Patent No.: US 8,286,896 B2
(45) Date of Patent: Oct. 16, 2012

(54) VALVE SEAT AND SHROUD FOR GASEOUS FUEL INJECTOR

(75) Inventors: Mahoro M. Fujita, Fairport, NY (US); Allan Richard Wells, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 216 days.

(21) Appl. No.: 12/732,262

(22) Filed: Mar. 26, 2010

(65) Prior Publication Data

US 2011/0233311 A1 Sep. 29, 2011

(51) Int. Cl.

| | |
|---|---|
| ***F02M 61/18*** | (2006.01) |
| ***F02M 61/04*** | (2006.01) |
| ***F02M 61/20*** | (2006.01) |
| ***F02M 61/00*** | (2006.01) |
| ***F16K 1/42*** | (2006.01) |

(52) U.S. Cl. .................. 239/533.2; 239/533.9; 239/584; 251/318; 251/359

(58) Field of Classification Search ............... 239/533.2, 239/533.3, 533.9, 533.11, 533.14, 583, 584, 239/585.1–585.5, 596; 251/154, 155, 318, 251/320, 321, 325, 328, 329, 333, 359, 366
See application file for complete search history.

(56) References Cited

U.S. PATENT DOCUMENTS

| | | | | |
|---|---|---|---|---|
| 4,483,485 | A * | 11/1984 | Kamiya et al. | 239/585.4 |
| 4,576,338 | A * | 3/1986 | Klomp | 239/452 |
| 5,108,037 | A * | 4/1992 | Okamoto et al. | 239/473 |
| 5,186,882 | A * | 2/1993 | Hafner | 264/257 |
| 5,285,969 | A * | 2/1994 | Greiner et al. | 239/463 |
| 5,360,197 | A * | 11/1994 | Reiter et al. | 251/129.21 |
| 2005/0040258 | A1* | 2/2005 | Dallmeyer et al. | 239/533.12 |
| 2005/0087627 | A1* | 4/2005 | Sayar | 239/533.12 |

* cited by examiner

*Primary Examiner* — Darren W Gorman
(74) *Attorney, Agent, or Firm* — Thomas N. Twomey

(57) ABSTRACT

A fuel injector is provided with a fuel inlet, a fuel outlet, and a fuel passage for communicating fuel from the inlet to the outlet. A valve and valve seat assembly is provided for selectively preventing and permitting fuel to pass from the fuel inlet to the fuel outlet. The valve seat is defined by a tubular body and a valve seat that traverses an inside wall surface of the tubular body. An upstream face of the valve seat is downstream of an upstream end of the tubular body and a downstream face of the valve seat is upstream of a downstream end of the tubular body. At least one passage is provided through the tubular body beginning downstream of the downstream face of the valve seat and upstream of the downstream end of the tubular body. A cover may be disposed at the downstream end of the tubular body.

21 Claims, 5 Drawing Sheets

VALVE SEAT AND SHROUD FOR GASEOUS FUEL INJECTOR

TECHNICAL FIELD OF INVENTION

The present invention relates to fuel injectors for supplying fuel to a fuel consuming device; and more particularly to fuel injectors for supplying a gaseous fuel to an internal combustion engine; and most particularly to a combined valve seat and shroud for such fuel injectors.

BACKGROUND OF INVENTION

One type of fuel that is used to power internal combustion engines and other fuel consuming devices is a gaseous fuel such as natural gas in the form of compressed natural gas (CNG) or liquefied propane gas (LPG). Fuel injectors for supplying a metered amount of gaseous fuel to a fuel consuming device such as an internal combustion engine are well known. In a typical fuel injector, a valve is located in a fuel passage of the fuel injector and is axially reciprocated in and out of contact with a valve seat to control the flow of fuel through the fuel injector. A common failure in gaseous fuel injectors at cold temperatures is for the valve to stick closed. Gaseous fuels do not have the lubricity that liquid fuels possess. This lack of lubricity allows moisture to condense and freeze on the fuel injector internal components when the internal combustion engine is not running and the fuel injector is allowed to cool to ambient temperature, thereby causing the internal components of the fuel injector to be bound together and preventing the valve from being opened.

Another shortcoming of some prior art gaseous fuel injectors is that the valve seat can be distorted when it is welded to the fuel injector or valve seat carrier during the manufacturing process due to the heat generated during the laser welding process and the close proximity of the weld to the seating surface of the valve seat. Misalignment due to lost parallelism of the valve seat with the valve may occur which can result in unsatisfactory performance of the fuel injector if the seating surface of the valve seat becomes distorted.

In order to prevent gaseous fuel injectors from sticking closed at cold temperatures it is known to provide a shroud or cap over the fuel outlet of the fuel injector. An example of a prior art fuel injector with a shroud is shown in FIG. 1. Fuel injector 10 includes fuel inlet 14 for receiving fuel, fuel outlet 16 for dispensing fuel, and fuel passage 18 for communicating fuel from fuel inlet 14 to fuel outlet 16. Valve assembly 20 is provided for selectively preventing and permitting fuel to pass from fuel inlet 14 to fuel outlet 16. Valve assembly 20 includes valve seat 22 located in fuel passage 18. Valve seat 22 includes apertures 40 for providing fluid communication therethrough. Valve assembly 20 also includes valve 42 with valve tip 41 located in fuel passage 18 for selectively preventing and permitting fuel to pass through apertures 40. In order to prevent valve 42 and valve tip 41 from being stuck shut at cold temperatures due to moisture condensing and freezing on the fuel injector internal components, shroud 43 is placed over fuel outlet 16. Shroud 43 may be made by machining or stamping and may be fixed to fuel injector 10 by welding, crimping, press fit, or any other known method. Shroud 43 may be cup shaped and include one or more fuel exit passages 44 to allow fuel to exit therefrom. Shroud 43 impedes gas flow and thereby prevents moisture from condensing on the valve components that would cause valve 42 and valve tip 41 to be stuck shut in cold conditions. However, shroud 43 requires addition components and processing to fuel injector 10 and therefore adds cost.

A second example of a prior art fuel injector is shown in FIG. 2. Fuel injector 10' shown in FIG. 2 is essentially the same as fuel injector 10 as shown in FIG. 1 with the exception of valve assembly 20' which includes valve seat 22'. In the prior art example shown in FIG. 2, valve seat 22' includes a separate and distinct disk 34 with apertures 40'. Disk 34 is welded within body 24 to complete valve seat 22'. As mentioned previously, welding disk 34 within tubular body 24 can cause valve seat 34 to become distorted which can result in unsatisfactory performance.

What is needed is a gaseous fuel injector that is less susceptible to sticking closed in cold conditions while requiring fewer components and less processing to the fuel injector compared to prior art fuel injectors with shrouds. What is also needed is a gaseous fuel injector that is less susceptible to valve seat distortion when the valve seat is secured to the fuel injector in the manufacturing process.

SUMMARY OF THE INVENTION

Briefly described, the present invention provides a fuel injector for supplying fuel to a fuel consuming device. The fuel injector includes a fuel inlet for receiving fuel, a fuel outlet for dispensing fuel from the fuel injector, and a fuel passage for communicating fuel from the fuel inlet to the fuel outlet. The fuel injector also includes a valve assembly for selectively preventing and permitting fuel to pass from the fuel inlet to the fuel outlet. The valve assembly includes a valve seat assembly disposed in the fuel passage. The valve seat assembly is defined by a tubular body having an upstream end, a downstream end, an outside wall surface connecting the upstream end to the downstream end, and an inside wall surface connecting the upstream end to the downstream end. The valve seat assembly is further defined by a valve seat of unitary construction that traverses the inside wall surface. The valve seat includes an upstream surface inset axially of and facing the upstream end, a downstream surface inset axially of and facing the downstream end, and an aperture providing fluid communication through the valve seat. The fuel injector also includes a valve located in the fuel passage for selectively preventing and permitting fuel flow through the aperture by selectively engaging and disengaging the valve seat.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

This invention will be further described with reference to the accompanying drawings in which.

DETAILED DESCRIPTION OF INVENTION

Figure 1:
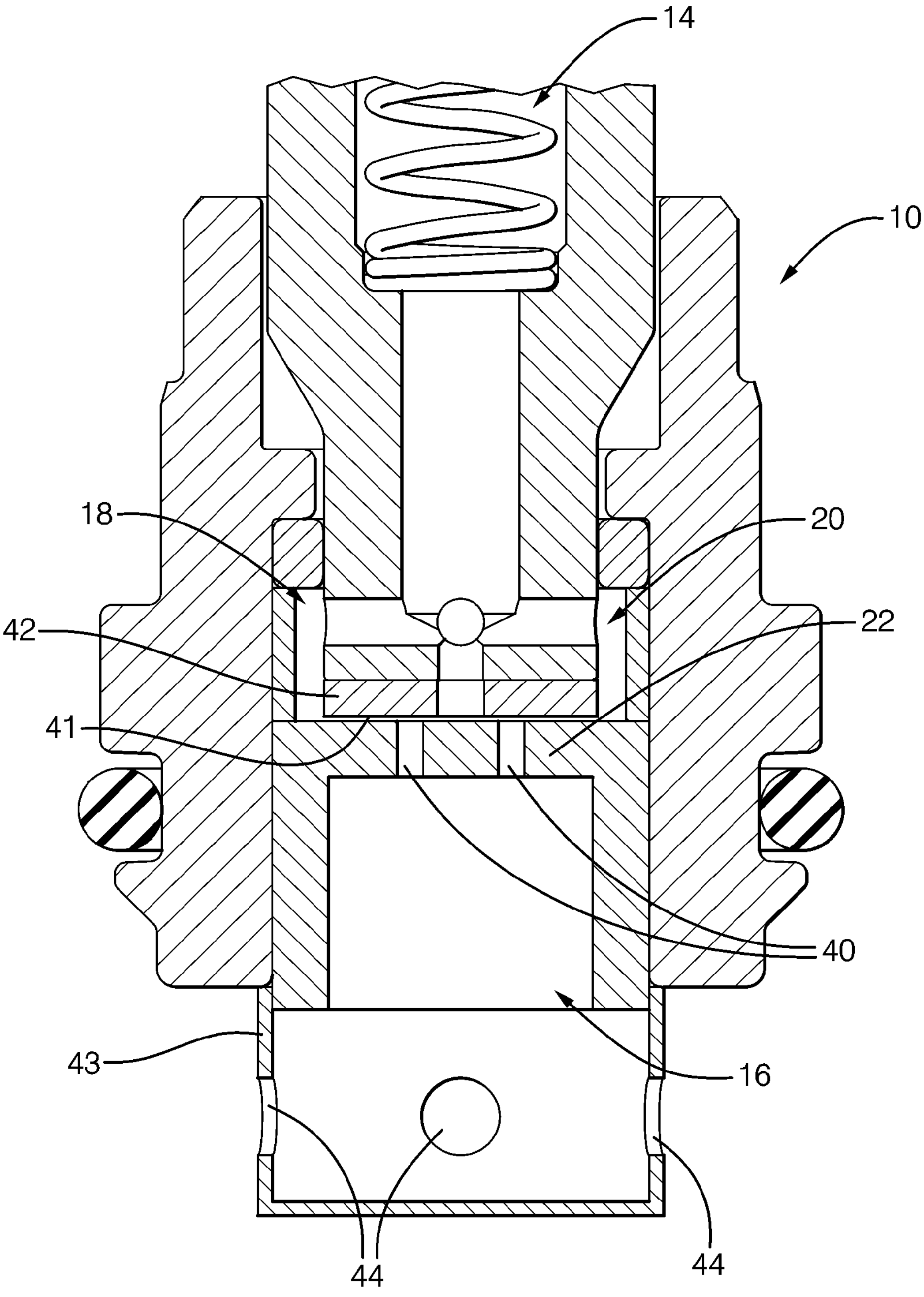
PRIOR ART FIG. 1
FIG. 1 is a cross section of a first prior art fuel injector with a shroud.
Figure 2:
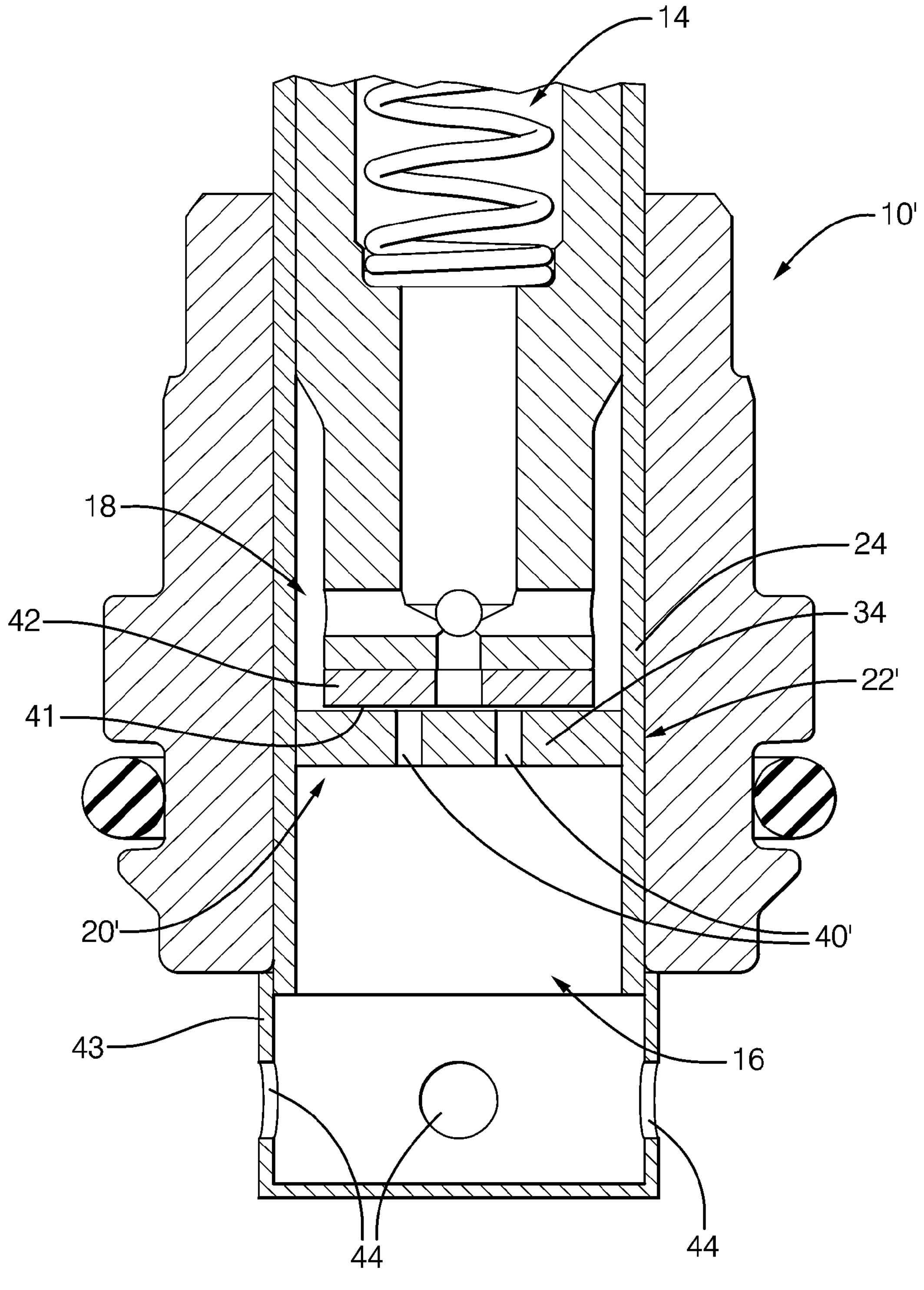
PRIOR ART FIG. 2
FIG. 2 is a cross section of a second prior art fuel injector with a shroud.
Figure 3:
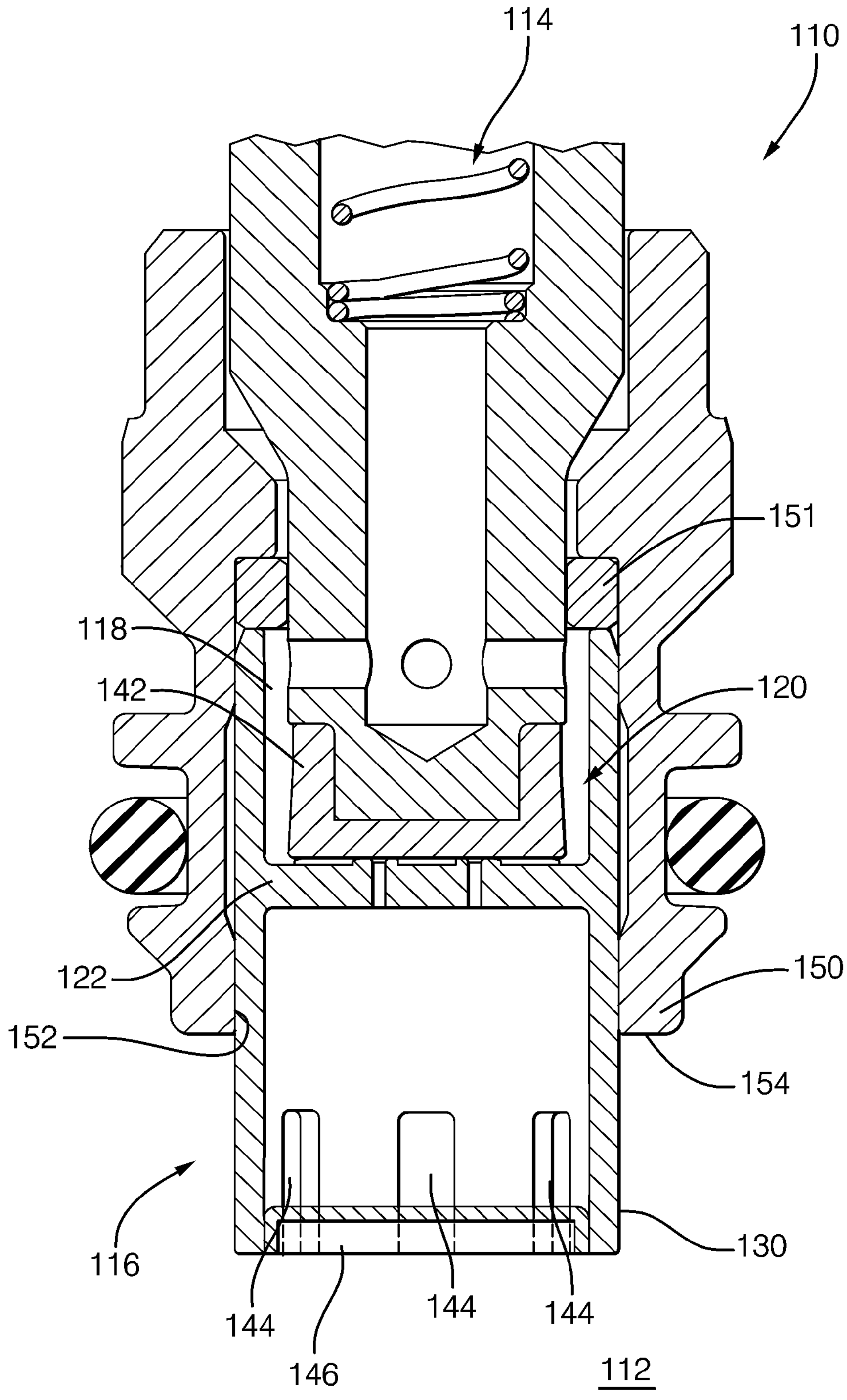
FIG. 3 is a cross section of a fuel injector in accordance with the present invention.

In accordance with a preferred embodiment of this invention and referring to FIG. 3, a portion of fuel injector 110 is shown for supplying fuel to a fuel consuming device 112. Fuel injector 110 includes fuel inlet 114 for receiving fuel, fuel outlet 116 for dispensing fuel from fuel injector 110, and fuel passage 118 for communicating fuel from fuel inlet 114 to fuel outlet 116. Fuel inlet 114 is upstream of fuel outlet 116.

Figure 4:
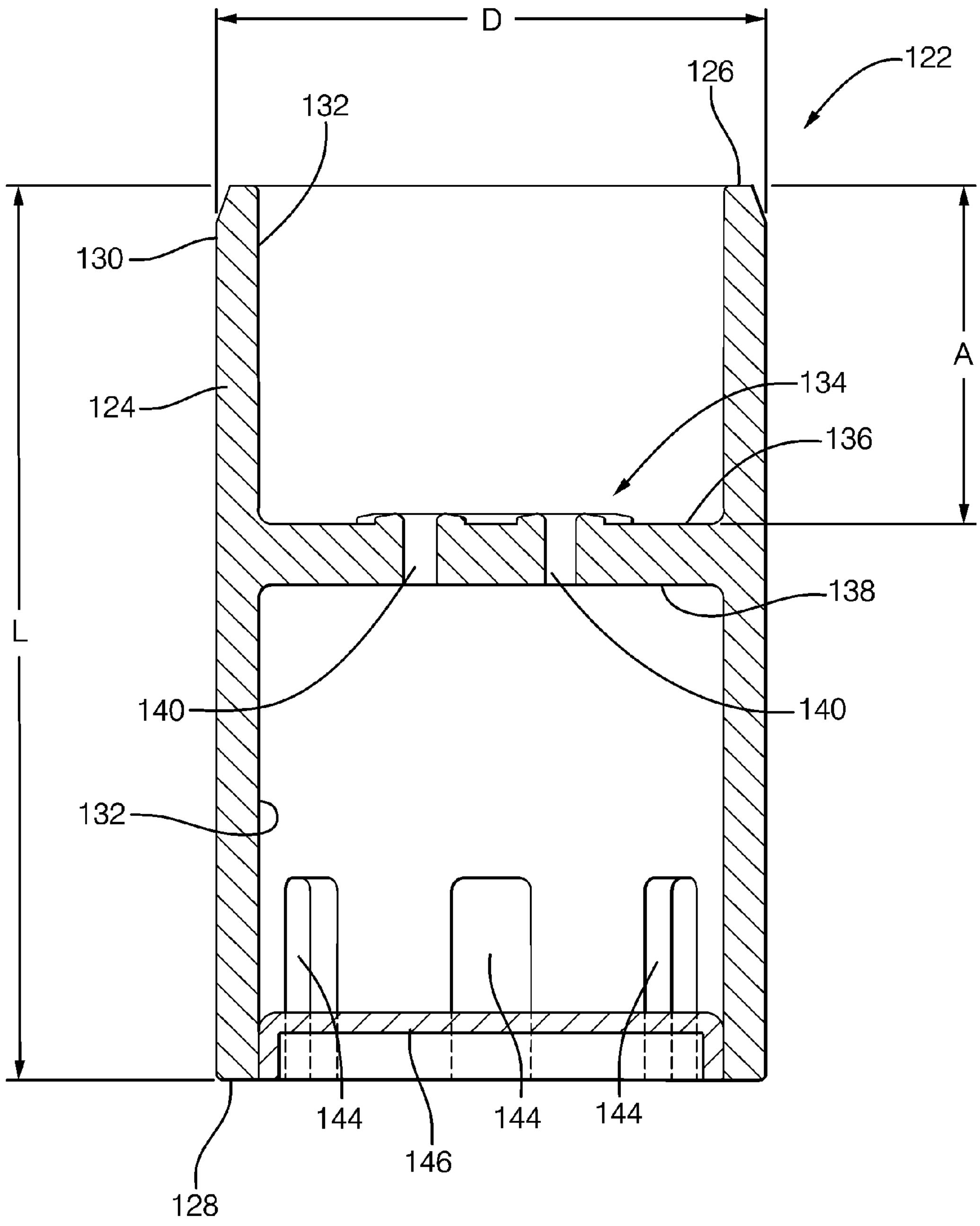
FIG. 4 is a cross section of a combination valve seat and shroud for a fuel injector in accordance with the present invention.

Now referring to FIGS. 3 and 4, valve assembly 120 is disposed in fuel passage 118 for selectively preventing and permitting fuel to pass from fuel inlet 114 to fuel outlet 116. Valve assembly 120 includes valve seat assembly 122 that is defined by tubular body 124 which includes upstream end 126 and downstream end 128. Outside wall surface 130 and inside wall surface 132 connect upstream end 126 to downstream end 128. Valve seat assembly 122 is further defined by valve seat 134 which traverses inside wall surface 132. Valve seat 134 includes upstream surface 136 which faces upstream end 126 and also includes downstream surface 138 which faces downstream end 128. At least one aperture 140 is provided through valve seat 134 in order to provide fluid communication through valve seat 134.

Upstream surface 136 of valve seat 134 is preferably inset from upstream end 126 of tubular body by a distance A. Valve seat assembly 122 has a diameter D that is defined by outside wall surface 130. Distance A is preferably at least 10% of the diameter D. By disposing valve seat 134 sufficiently axially inset from both upstream end 126 and downstream end 128, valve seat 134 is protected from damage during the manufacturing process and shipping because it is sheltered within tubular body 124. Damage to valve seat 134 may result in unsatisfactory leak performance of fuel injector 110 by failing to completely stop the flow of fuel from fuel inlet 114 to fuel outlet 116 when desired.

Valve seat 134 is preferably of unitary construction with tubular body 124. That is, tubular body 124 and valve seat 134 are preferably formed as a single piece without the need to join two or more separate components together. Forming tubular body 124 as a single piece with valve seat 134 eliminates the need to join valve seat 134 to tubular body 124 by additional operations such as welding valve seat 134 to tubular body 124 which could cause distortion to valve seat 134 resulting in undesired performance of fuel injector 110.

Valve assembly 120 also includes valve 142. Valve 142 is disposed in fuel passage 118 for selectively preventing and permitting fuel flow through valve seat 134 by selectively engaging and disengaging valve seat 134, thereby preventing and permitting fuel to flow from fuel inlet 114 to fuel outlet 116. Selective engagement and disengagement of valve 142 with valve seat 134 is accomplished by axially reciprocating valve 142 in fuel passage 118 with an actuator (not shown). Actuators for reciprocating a valve in a fuel injector are well known to those skilled in the art of fuel injectors and will not be discussed further herein.

At least one passage 144 may be provided radially through tubular body 124. Passage 144 begins downstream of downstream surface 138 of valve seat 134 and upstream of downstream end 128 of tubular body 124 and extends axially toward downstream end 128 of tubular body 124. Preferably, passage 144 extends axially to downstream end 128. Since the lower portion of passage 144 is obscured by cover 146 in FIGS. 3 and 4, the lower portion of passage 144 that is obscured by cover 146 is represented by hidden lines. Passage 144 provides an opening radially through tubular body 124 to allow fluid communication from inside wall surface 132 to outside wall surface 130.

Figure 5:
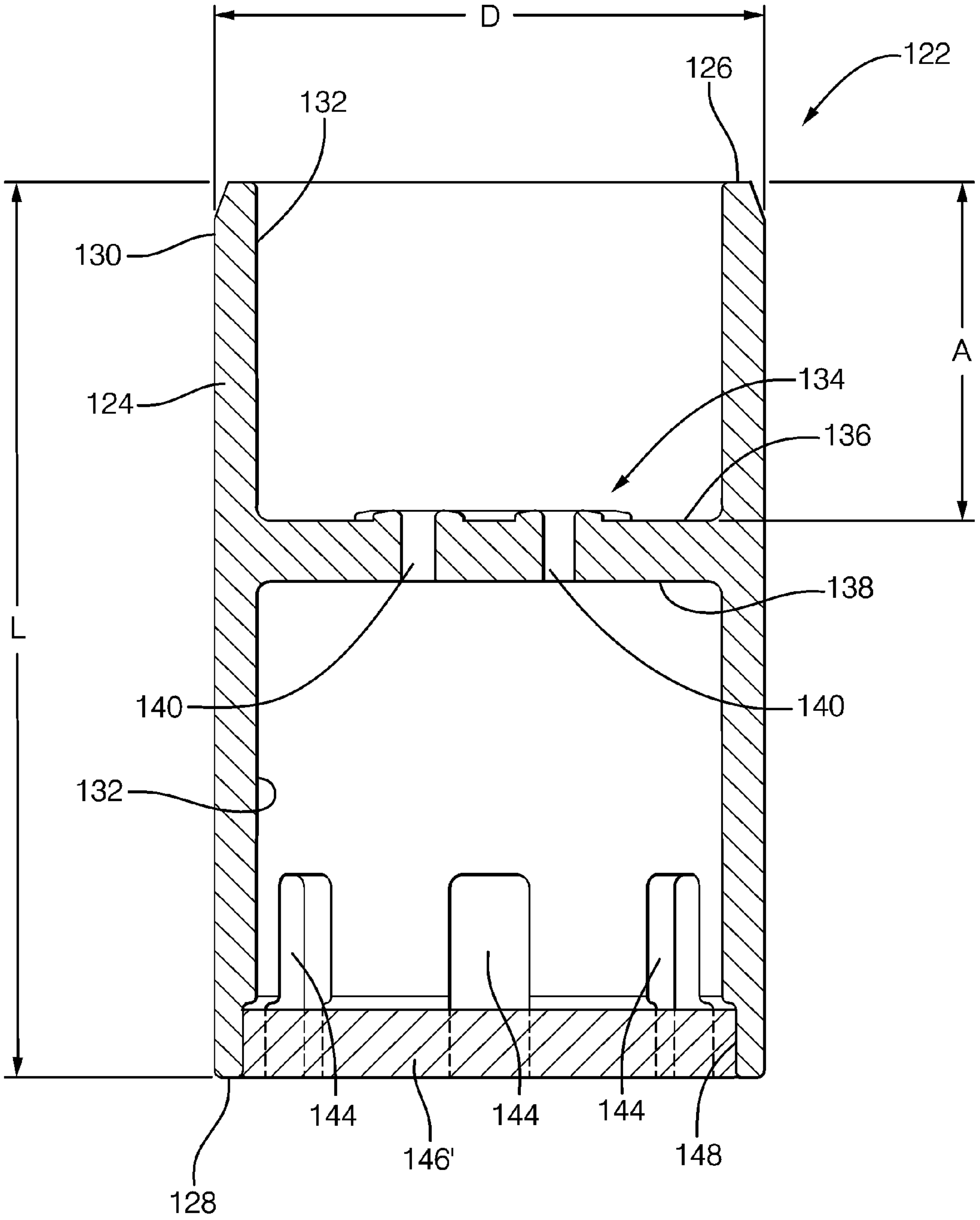
FIG. 5 is a cross section of a second embodiment of a combination valve seat and shroud for a fuel injector in accordance with the present invention.

Cover 146 may be disposed at downstream end 128 of tubular body 124 for limiting axial fluid communication out of tubular body 124 with the environment. Cover 146 may be cup shaped and may have an interference fit with inside wall surface 132. Although cover 146 is shown in FIGS. 3 and 4 with the concave end of the cup shape oriented downward, the concave end of the cup shape could also be oriented upward. Attachment of cover 146 to tubular body may be accomplished by way of the interference fit with inside wall surface 132 or may additionally or alternatively be attached by welding, crimping, cold deforming, magneforming, or any other known method. When cover 146 is disposed at downstream end 128 of tubular body 124, fuel exiting fuel injector 110 will be expelled through passage 144. The addition of cover 146 deters moisture from migrating to valve 142 and valve seat 134 where the moisture could condense and freeze, thereby causing fuel injector 110 to be inoperable. In a second embodiment as shown in FIG. 5, cover 146' takes the form of a flat disk and may be received by step 148 formed in inside wall surface 132 at downstream end 128 of tubular body 124. Although not illustrated, cover 146, 146' may also include one or more passages therethrough.

Fuel injector 110 includes lower housing 150 for receiving valve seat assembly 122. Upstream end 126 of tubular body 124 is disposed in stepped bore 152 of lower housing 150. Valve guide 151 may be axially disposed between stepped bore 152 and upstream end 126 of tubular body 124 for guiding valve 142 in operation of fuel injector 110. Passages 144 of tubular body 124 extend downstream past distal end 154 of lower housing 150 in order for fuel to be expelled from fuel injector 110. Valve seat assembly 122 may be welded to lower housing 150 where outside wall surface 130 meets distal end 154 of lower housing 150. Because the weld is sufficiently distanced from valve seat 134, distortion of valve seat 134 due to the heat generated during the welding operation is unlikely and therefore does not affect the alignment of valve 142 with valve seat 134.

Valve seat assembly 122 has a length L that extends from upstream end 126 to downstream end 128. Preferably, valve seat assembly 122 has a length L to diameter D ratio that allows for centerless grinding of outside wall surface 130. Preferably, the ratio of length L to diameter D is at least 1 to 1. Outside wall surface 130 may be centerless ground in order to provide the close tolerance fit with stepped bore 152 of lower housing 150 that is needed in order to establish the precise interface (concentricity and/or perpendicularity) of valve seat 134 with valve 142 to achieve the desired performance of fuel injector 110.

Valve seat assembly 122 is preferably made from the process of metal injection molding or powder metal process. Using metal injection molding or powder metal process allows valve seat assembly 122 to be net formed with little or no further processing required to complete valve seat 134, apertures 140, passages 144, or step 148. These features are therefore created without adding cost.

Although not illustrated, one of ordinary skill in the art will now recognize and appreciate that valve seat 134 may traverse inside wall surface 132 such that upstream surface 136 is substantially even with upstream end 126. In this arrangement, an annular shaped spacer may be axially disposed between lower housing 150 and valve seat assembly 122.

One of ordinary skill in the art will now also recognize and appreciate that although fuel injector 110 has been illustrated as having a flat valve and flat seat configuration, other valve and valve seat configurations may also be used. For example, a fuel injector with a spherical shaped valve that interfaces with a conical shaped seat could also be used.

While this invention has been described in terms of the preferred embodiments thereof, it is not intended to be so limited, but rather only to the extent set forth in the claims that follow.

We claim:

1. A fuel injector for supplying fuel to a fuel consuming device, said fuel injector comprising:

a fuel inlet for receiving fuel;

a fuel outlet for dispensing fuel from said fuel injector;

a fuel passage for communicating fuel from said fuel inlet to said fuel outlet; and a valve assembly for selectively preventing and permitting fuel to pass from said fuel inlet to said fuel outlet, said valve assembly comprising:

a valve seat assembly disposed in said fuel passage, said valve seat assembly being defined by a tubular body having an upstream end, a downstream end, an outside wall surface connecting said upstream end to said downstream end, and an inside wall surface connecting said upstream end to said downstream end, said valve seat assembly being further defined by a valve seat of unitary construction with said tubular body and traversing said inside wall surface, said valve seat having an upstream surface inset axially of and facing said upstream end, a downstream surface inset axially of and facing said downstream end, and an aperture providing fluid communication through said valve seat; and a valve located in said fuel passage for selectively preventing and permitting fuel flow through said aperture by selectively engaging and disengaging said valve seat;

wherein said tubular body includes a passage extending radially therethrough to provide fluid communication from said inside wall surface to said outside wall surface, said passage beginning downstream of said downstream surface and upstream of said downstream end and extending axially to said downstream end.

2. A fuel injector as in claim 1 further comprising a cover at said downstream end.

3. A fuel injector as in claim 2, wherein said cover is received in a step formed in said inside wall surface at said downstream end.

4. A fuel injector as in claim 1, wherein said valve seat assembly has a length to diameter ratio enabling centerless grinding of said outside wall surface.

5. A fuel injector as in claim 4, wherein said valve seat assembly has a length to diameter ratio of at least 1 to 1.

6. A fuel injector as in claim 1, wherein said valve seat assembly is made by a method selected from the group consisting of metal injection molding and powder metal process.

7. A fuel injector as in claim 1, wherein said fuel injector is a gaseous fuel injector for supplying gaseous fuel.

8. A valve seat assembly for a fuel injector, said valve seat assembly comprising:

a tubular body having an upstream end, a downstream end, an outside wall surface connecting said upstream end to said downstream end, an inside wall surface connecting said upstream end to said downstream end; and a valve seat of unitary construction with said tubular body and traversing said inside wall surface, said valve seat having an upstream surface inset axially of and facing said upstream end, a downstream surface inset axially of and facing said downstream end, and an aperture providing fluid communication through said valve seat;

wherein said tubular body includes a passage extending radially therethrough to provide fluid communication from said inside wall surface to said outside wall surface, said passage beginning downstream of said downstream surface and upstream of said downstream end and extending axially to said downstream end.

9. A valve seat assembly as in claim 8 further comprising a cover at said downstream end.

10. A valve seat assembly as in claim 9, wherein said cover is received in a step formed in said inside wall surface at said downstream end.

11. A valve seat assembly as in claim 8, wherein said valve seat assembly has a length to diameter ratio enabling centerless grinding of said outside wall surface.

12. A valve seat assembly as in claim 11, wherein said valve seat assembly has a length to diameter ratio of at least 1 to 1.

13. A valve seat assembly as in claim 8, wherein said valve seat assembly is made by a method selected from the group consisting of metal injection molding and powder metal process.

14. A fuel injector for supplying fuel to a fuel consuming device, said fuel injector comprising:

a fuel inlet for receiving fuel;

a fuel outlet for dispensing fuel from said fuel injector;

a fuel passage for communicating fuel from said fuel inlet to said fuel outlet; and a valve assembly for selectively preventing and permitting fuel to pass from said fuel inlet to said fuel outlet, said valve assembly comprising:

a valve seat assembly disposed in said fuel passage, said valve seat assembly being defined by a tubular body having an upstream end, a downstream end, an outside wall surface connecting said upstream end to said downstream end, and an inside wall surface connecting said upstream end to said downstream end, said valve seat assembly being further defined by a valve seat traversing said inside wall surface, said valve seat having a downstream surface inset axially of and facing said downstream end, an upstream surface offset axially of said downstream surface and facing said upstream end, and an aperture providing fluid communication through said valve seat, wherein said tubular body includes a passage radially therethrough, said passage beginning downstream of said downstream surface and upstream of said downstream end and extending axially to said downstream end to provide fluid communication from said inside wall surface to said outside wall surface; and a valve located in said fuel passage for selectively preventing and permitting fuel flow through said aperture by selectively engaging and disengaging said valve seat.

15. A fuel injector as in claim 14, wherein said valve seat is of unitary construction with said tubular body.

16. A fuel injector as in claim 14 further comprising a cover at said downstream end.

17. A fuel injector as in claim 16, wherein said cover is received in a step formed at said downstream end.

18. A fuel injector as in claim 14, wherein said valve seat assembly has a length to diameter ratio enabling centerless grinding of said outside wall surface.

19. A fuel injector as in claim 18, wherein said valve seat assembly has a length to diameter ratio of at least 1 to 1.

20. A fuel injector as in claim 14, wherein said valve seat assembly is made by a method selected from the group consisting of metal injection molding and powder metal process.

21. A fuel injector as in claim 14, wherein said fuel injector is a gaseous fuel injector for supplying gaseous fuel.

* * * * *